United States Patent
Yoshikawa et al.

(10) Patent No.: US 10,078,907 B2
(45) Date of Patent: Sep. 18, 2018

(54) DISTANCE MEASUREMENT APPARATUS, DISTANCE MEASUREMENT METHOD, AND STORAGE MEDIUM

(71) Applicant: CANON KABUSHIKI KAISHA, Tokyo (JP)

(72) Inventors: Hiroshi Yoshikawa, Kawasaki (JP); Shinji Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 15/075,634

(22) Filed: Mar. 21, 2016

(65) Prior Publication Data

US 2016/0284102 A1   Sep. 29, 2016

(30) Foreign Application Priority Data

Mar. 24, 2015 (JP) ................. 2015-061686

(51) Int. Cl.
| | |
|---|---|
| *G06T 7/60* | (2017.01) |
| *G06T 5/00* | (2006.01) |
| *G01C 3/08* | (2006.01) |
| *G06K 9/20* | (2006.01) |

(52) U.S. Cl.
CPC ............. *G06T 7/60* (2013.01); *G01C 3/08* (2013.01); *G06T 5/00* (2013.01); *G06K 9/2036* (2013.01); *G06T 2207/20024* (2013.01)

(58) Field of Classification Search
CPC ..................................................... G06T 7/60
USPC .......................................... 348/135
See application file for complete search history.

(56) References Cited

U.S. PATENT DOCUMENTS

| | | | | |
|---|---|---|---|---|
| 4,634,279 A | * | 1/1987 | Ross ................ | G01B 11/2536 |
| | | | | 250/558 |
| 9,792,491 B1 | * | 10/2017 | Ramaswamy | ..... G06K 9/00362 |
| 2006/0288325 A1 | * | 12/2006 | Miyamoto | .......... G03F 7/70625 |
| | | | | 716/50 |

(Continued)

FOREIGN PATENT DOCUMENTS

| | | |
|---|---|---|
| JP | 2004-191198 A | 7/2004 |
| JP | 2004191198 A * | 7/2004 |
| JP | 2012085231 A * | 4/2012 |

*Primary Examiner* — Dave Czekaj
*Assistant Examiner* — Shanika Brumfield
(74) *Attorney, Agent, or Firm* — Canon USA, Inc. I.P. Division

(57) ABSTRACT

Even in a case where an amount-of-reflected-light distribution of a surface is locally different, in order to measure a distance with high accuracy, at least one embodiment of a distance measurement apparatus includes an image acquisition unit configured to acquire a first captured image obtained by capturing a measurement target object onto which a measurement pattern is projected, and a second captured image obtained by capturing the measurement target object irradiated with approximately uniform illumination, a smoothing filter determination unit configured to, based on the second captured image, determine a smoothing filter to be applied to the first captured image, a smoothing filter application unit configured to apply the smoothing filter determined by the smoothing filter determination unit to the first captured image, and a measurement unit configured to measure a distance from the measurement target object based on the first captured image to which the smoothing filter is applied.

21 Claims, 13 Drawing Sheets

(56) References Cited

U.S. PATENT DOCUMENTS

| | | | |
|---|---|---|---|
| 2013/0194390 A1* | 8/2013 | Hirooka | G01C 11/025 348/47 |
| 2015/0130995 A1* | 5/2015 | Nishiyama | G06T 5/003 348/370 |
| 2016/0335475 A1* | 11/2016 | Krenzer | G06K 9/00335 |

* cited by examiner

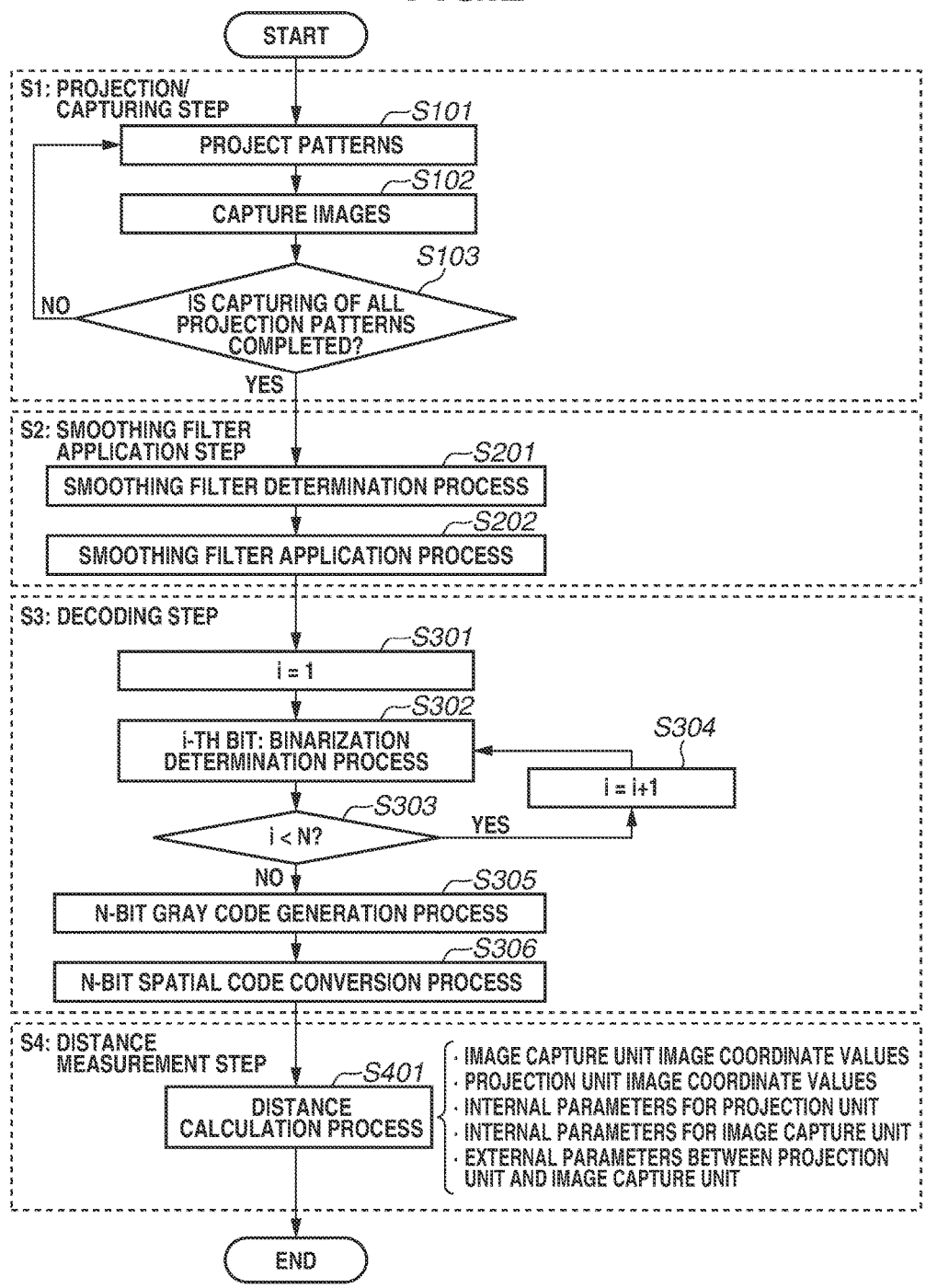

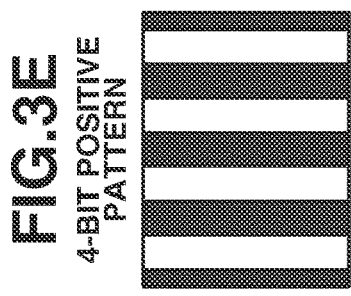
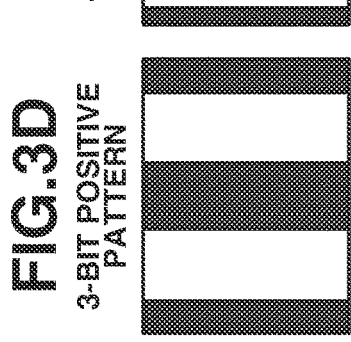
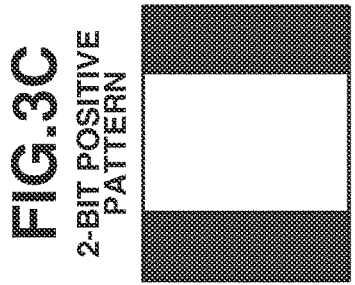
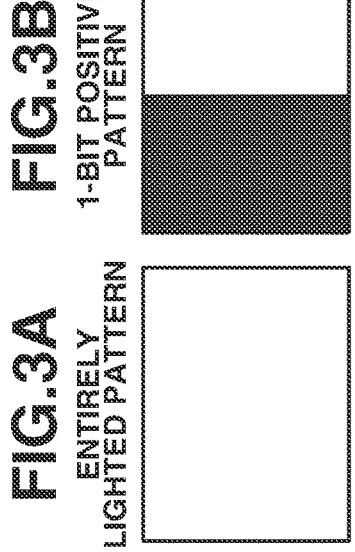
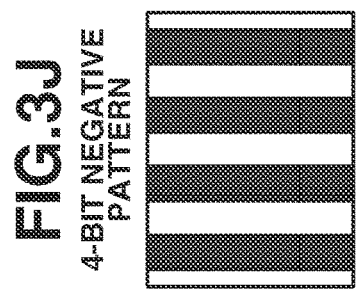
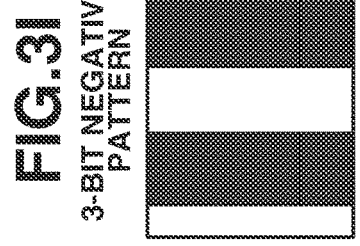
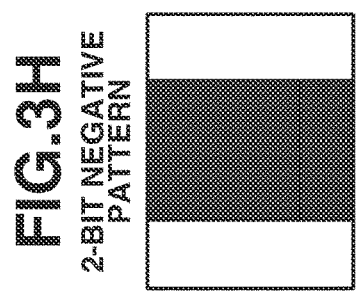
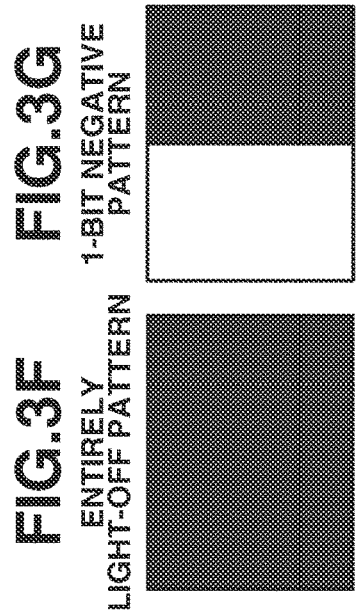

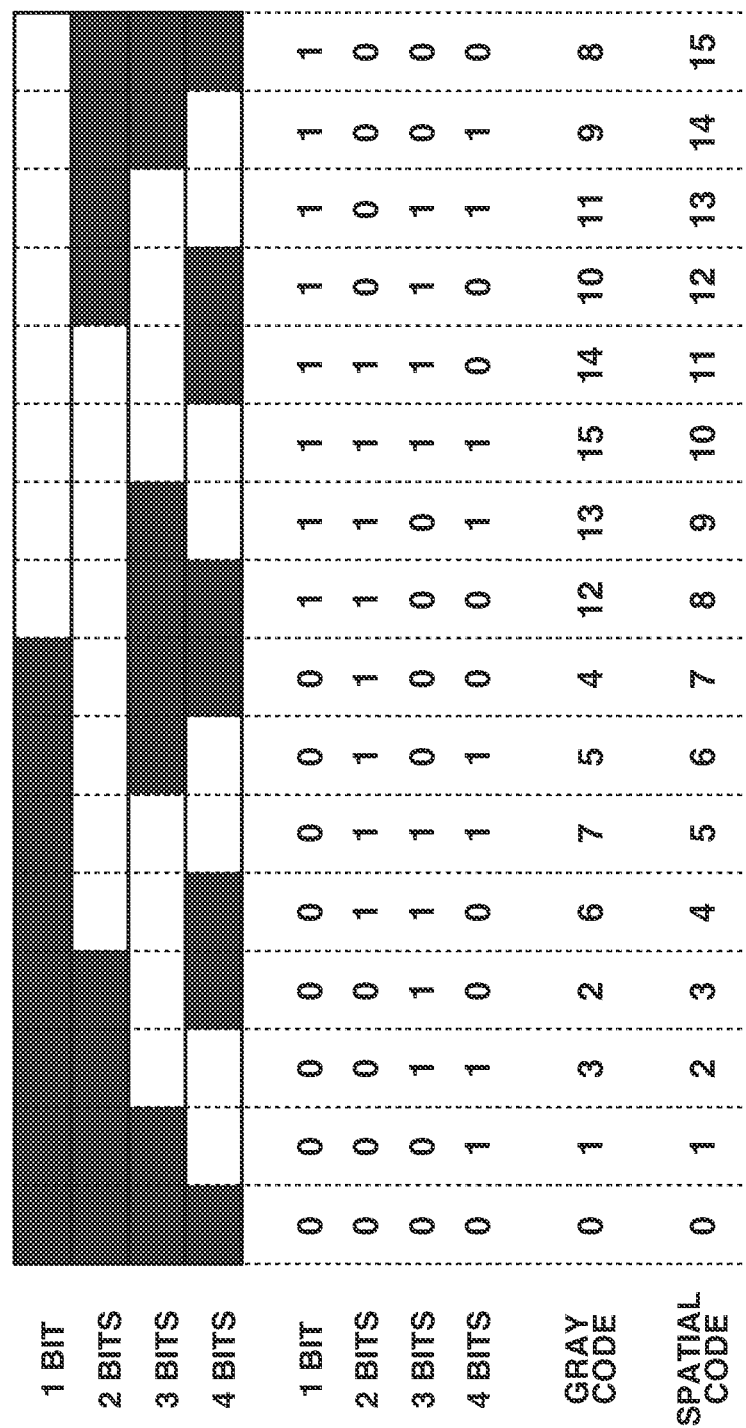

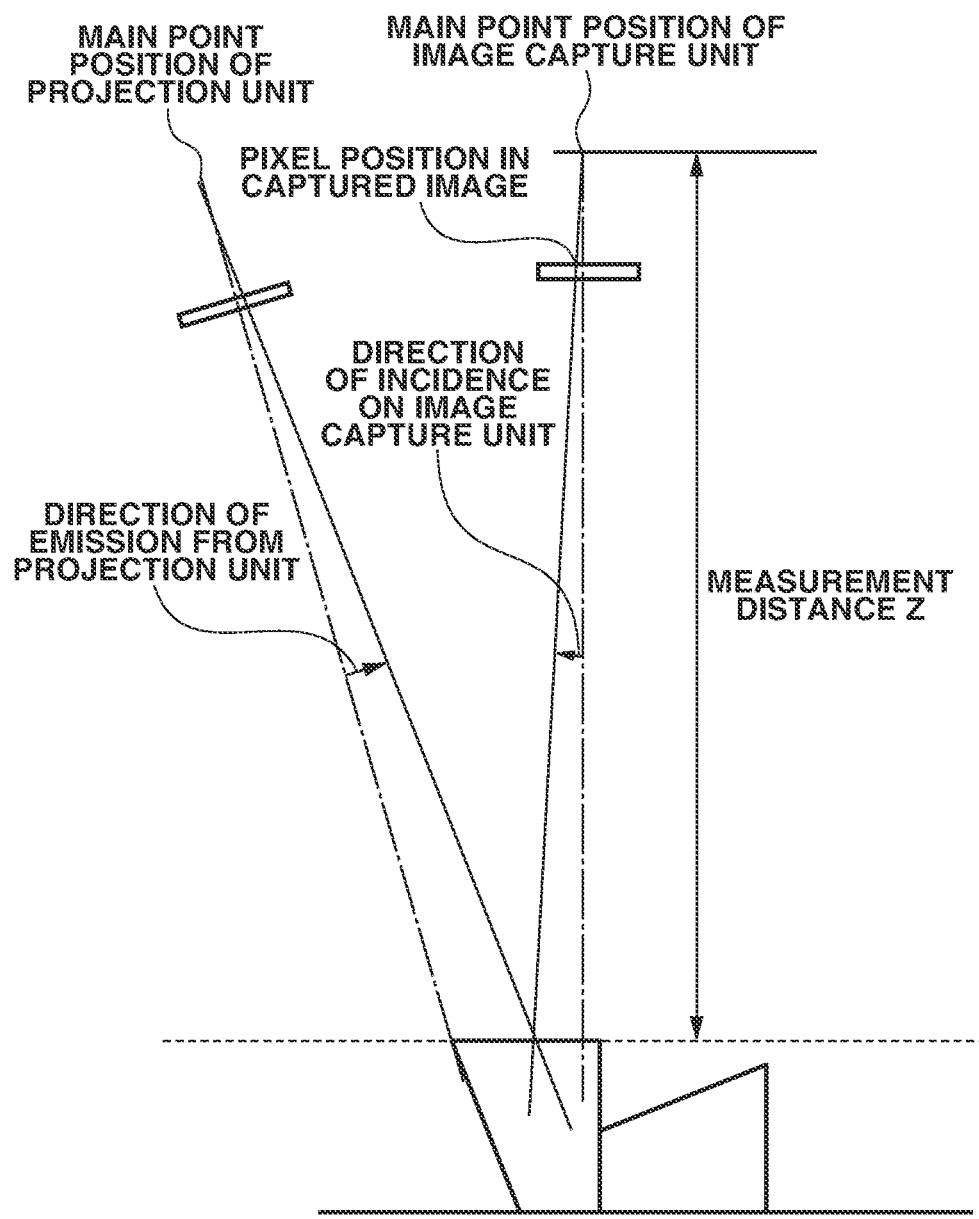

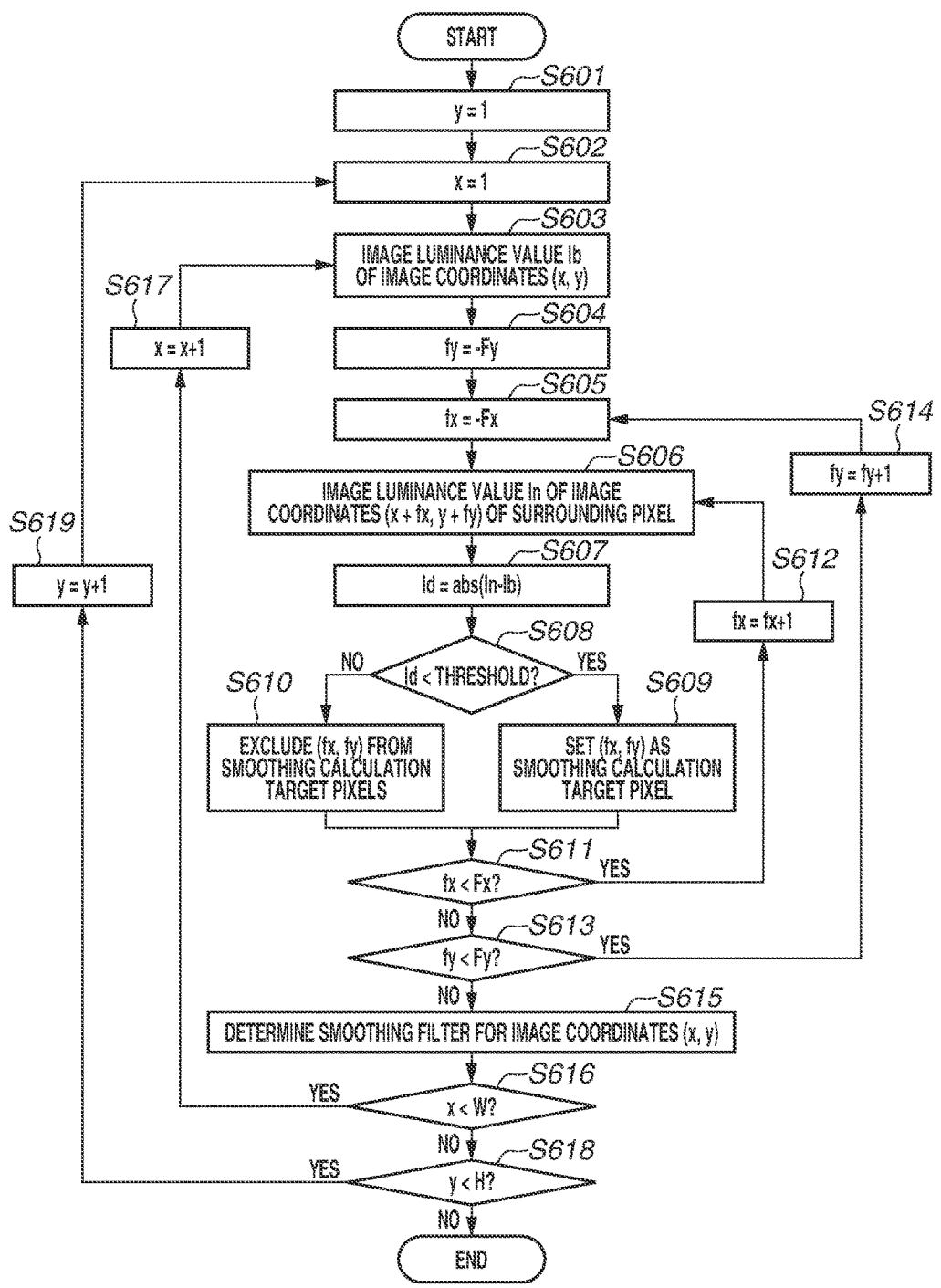

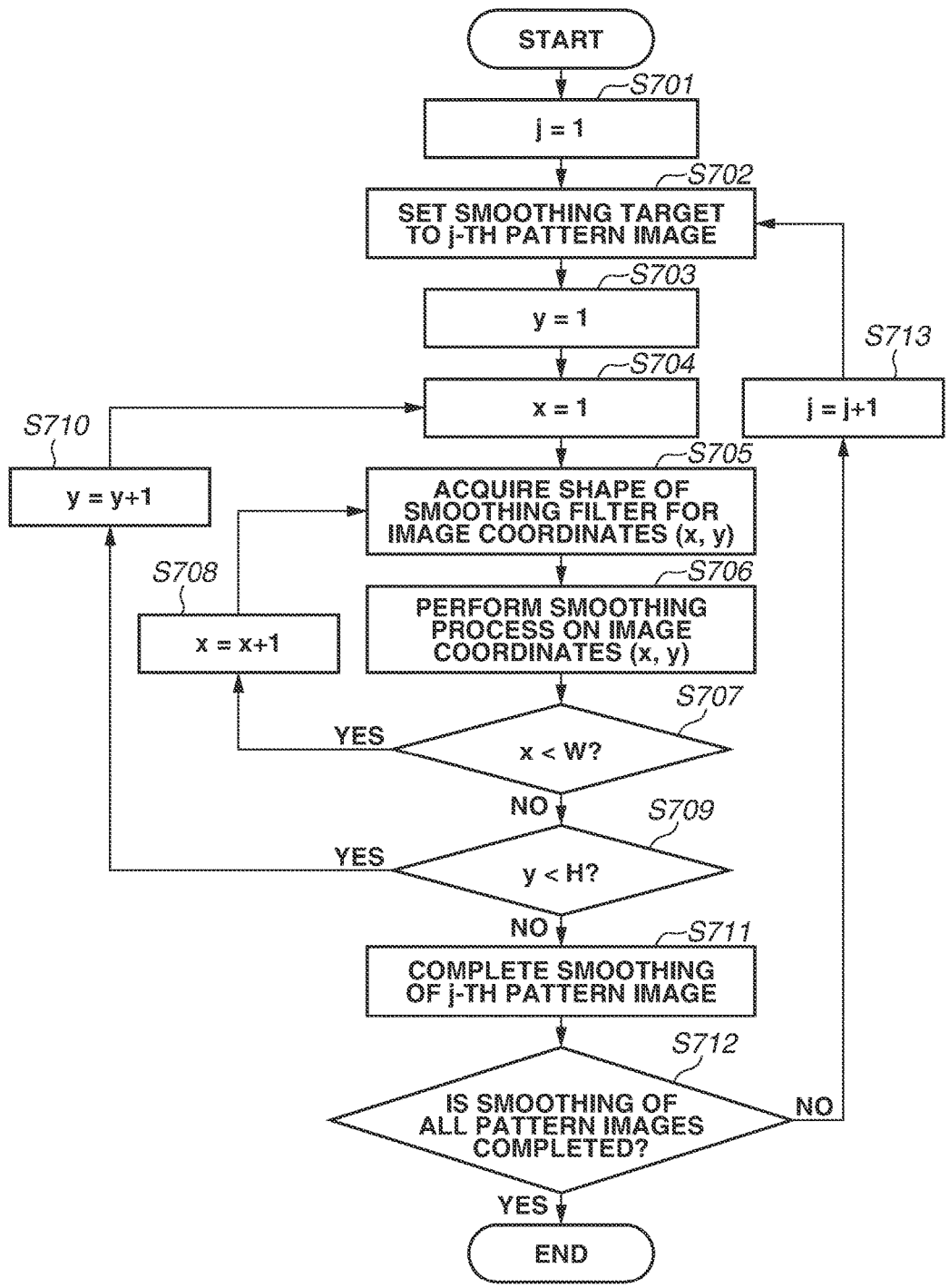

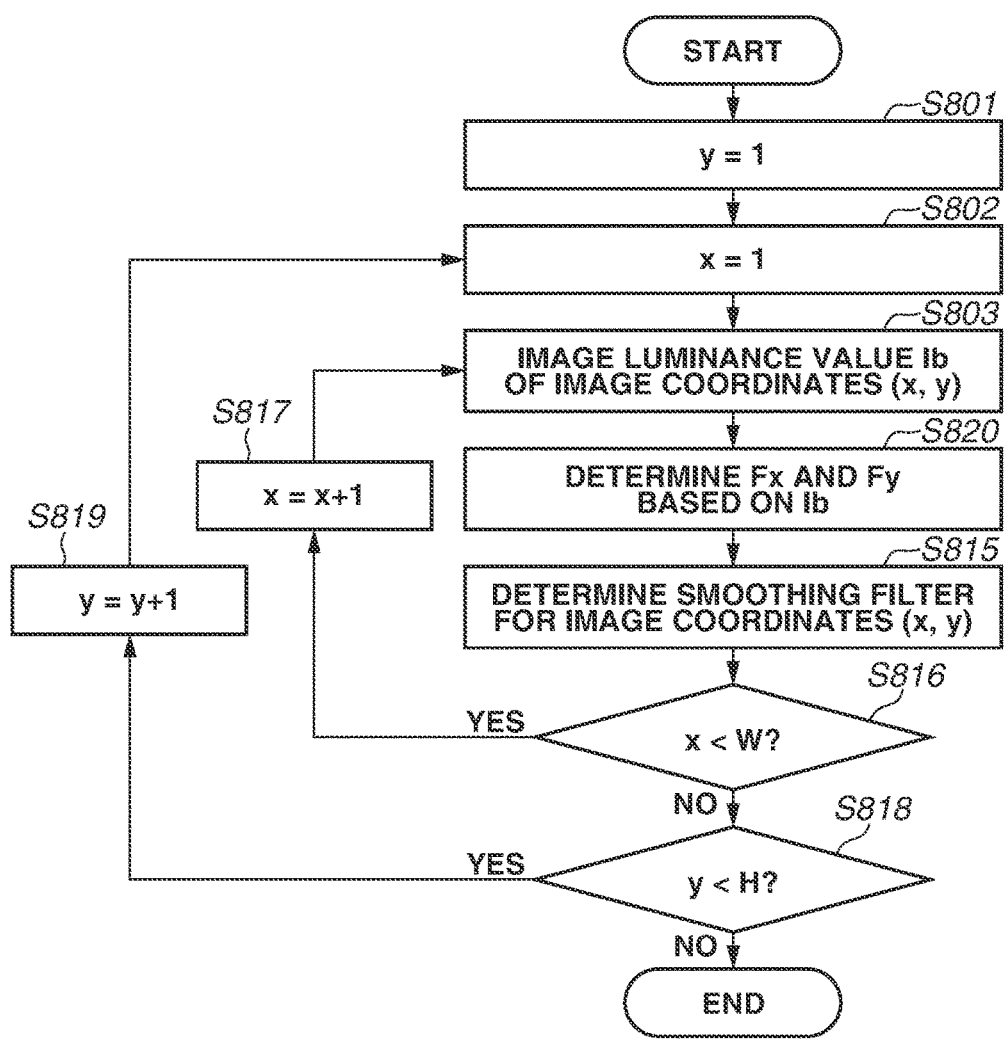

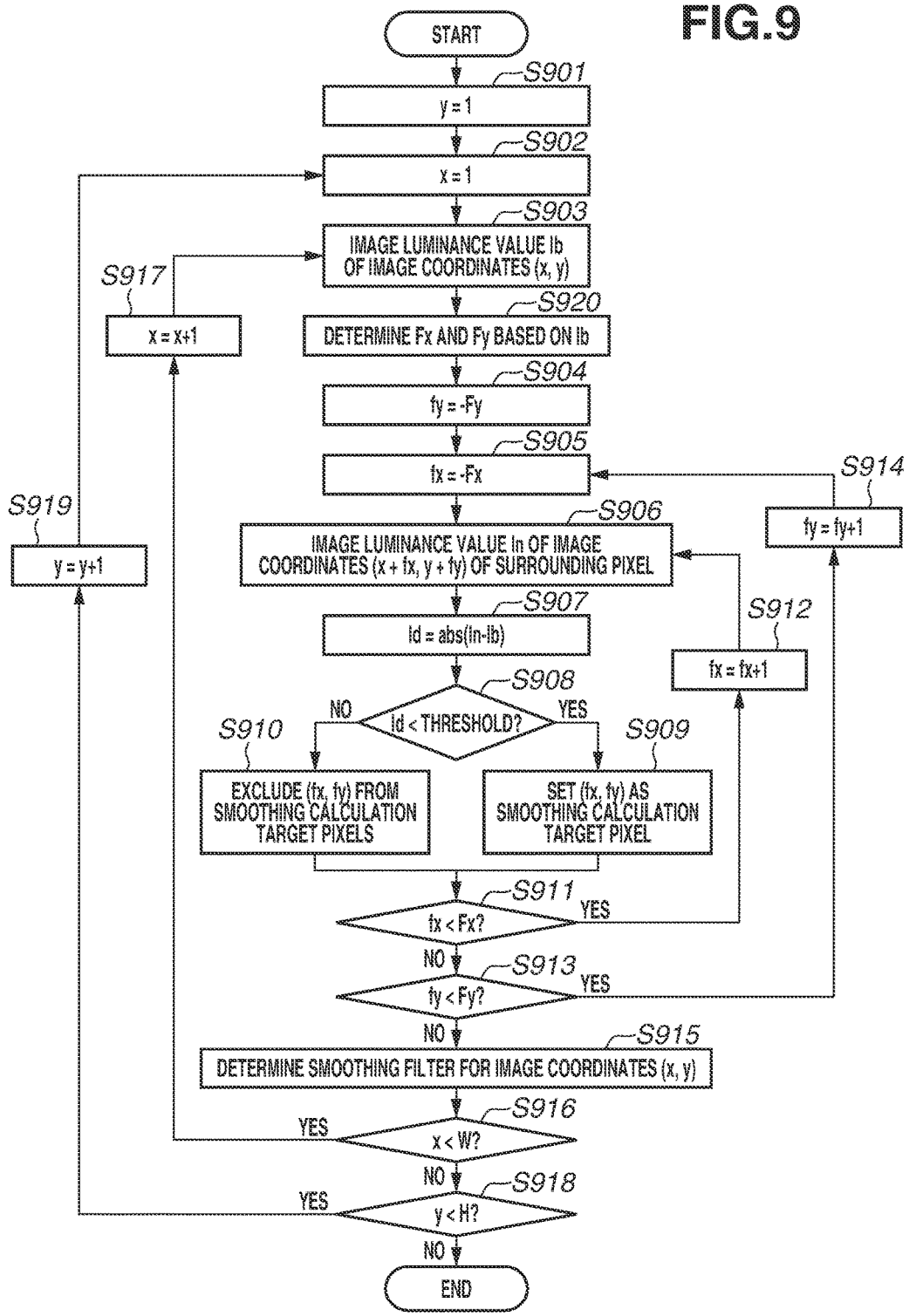

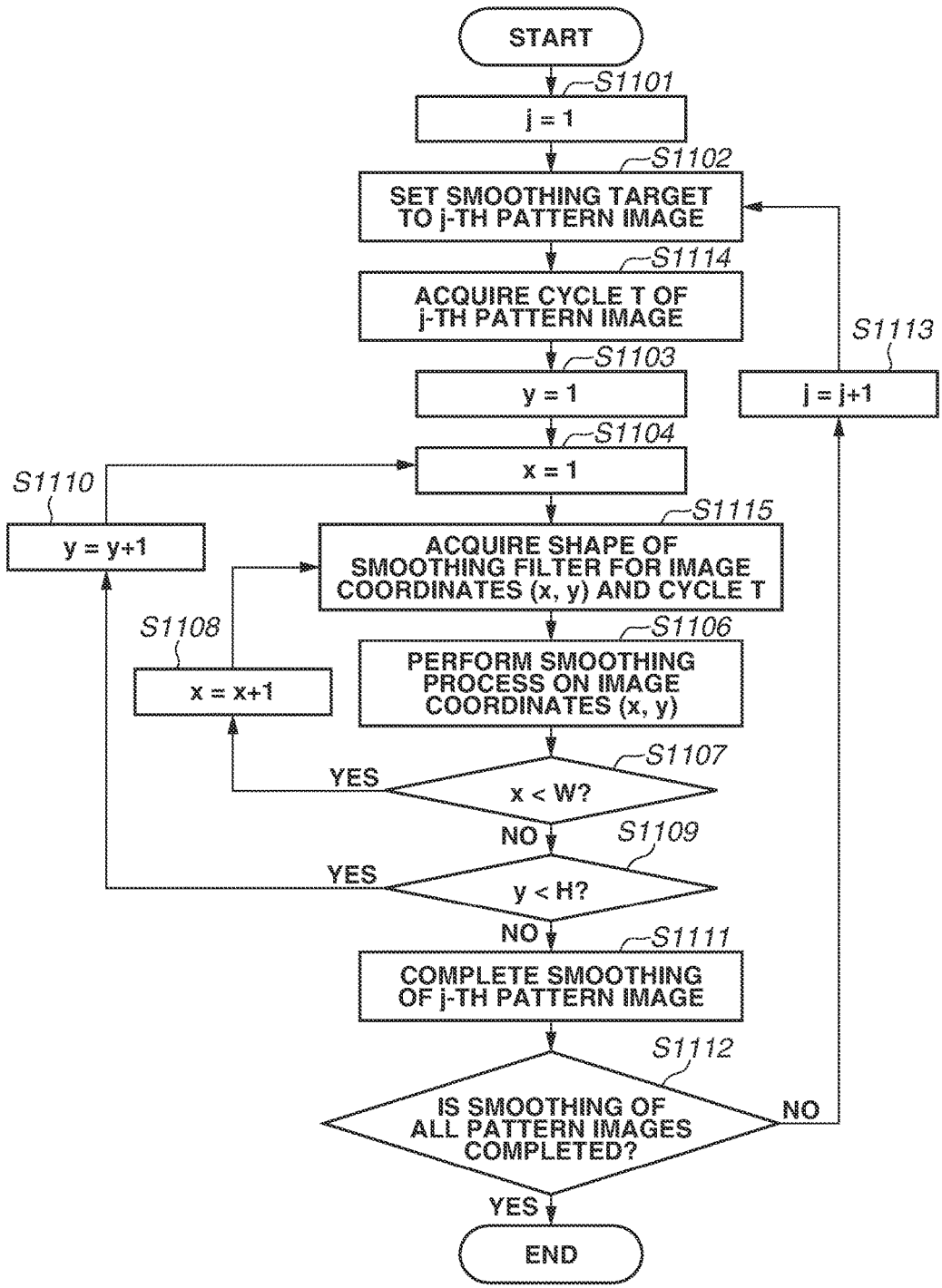

FIG.12A
PIXEL OF INTEREST 1 AND CORRESPONDING SURROUNDING PIXELS

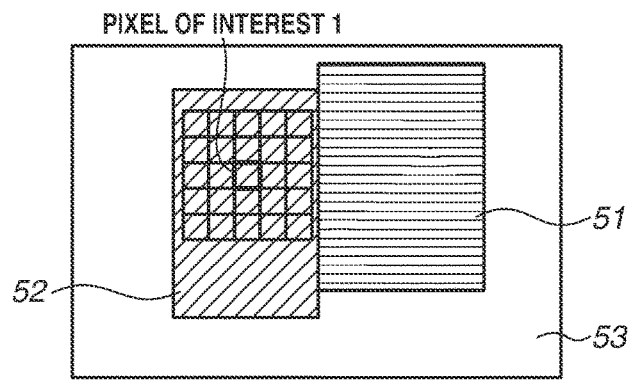

FIG.12B
EDGE-PRESERVING SMOOTHING FILTER FOR PIXEL OF INTEREST 1

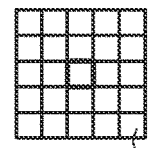

SMOOTHING FILTER CALCULATION TARGET PIXELS

FIG.12C
PIXEL OF INTEREST 2 AND CORRESPONDING SURROUNDING PIXELS

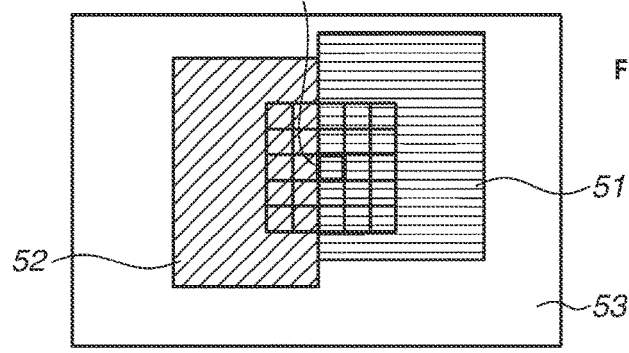

FIG.12D
EDGE-PRESERVING SMOOTHING FILTER FOR PIXEL OF INTEREST 2

PIXELS EXCLUDED FROM SMOOTHING FILTER CALCULATION TARGET PIXELS

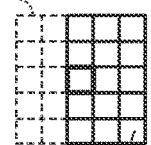

SMOOTHING FILTER CALCULATION TARGET PIXELS

FIG.12E
PIXEL OF INTEREST 3 AND CORRESPONDING SURROUNDING PIXELS

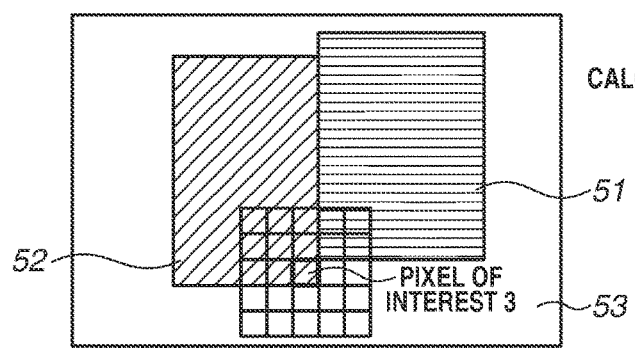

FIG.12F
EDGE-PRESERVING SMOOTHING FILTER FOR PIXEL OF INTEREST 3

SMOOTHING FILTER CALCULATION TARGET PIXELS

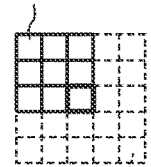

PIXELS EXCLUDED FROM SMOOTHING FILTER CALCULATION TARGET PIXELS

DISTANCE MEASUREMENT APPARATUS, DISTANCE MEASUREMENT METHOD, AND STORAGE MEDIUM

BACKGROUND OF THE INVENTION

Field of the Invention

The present disclosure relates to a distance measurement apparatus for measuring the three-dimensional distance of a measurement target object in a non-contact manner.

Description of the Related Art

Conventionally, various techniques are discussed as a distance measurement method. The distance measurement method is broadly classified into a passive distance measurement method for measuring a distance using only an imaging apparatus without using an illumination apparatus, and an active distance measurement method for measuring a distance using an illumination apparatus and an imaging apparatus in combination. In the active distance measurement method, the illumination apparatus projects pattern light onto a measurement target object, and the imaging apparatus captures an image. Therefore, even if the amount of surface texture of the measurement target object is small, it is possible to measure a distance using the pattern light as a clue. As the active distance measurement method, various techniques, such as a spatial coding method, a phase shift method, a grid pattern projection method, and a light-section method are discussed. These techniques are based on a triangulation method and therefore measure a distance based on the direction of emission of pattern light from a projection apparatus.

If the measurement target object is directed in various directions, or if the measurement target object includes members having various reflectances, a region where the image luminance is high and a region where the image luminance is low coexist in the captured image. In the region where the image luminance is high, the contrast of the pattern light is high, and the noise component is small. Thus, it is possible to measure a distance in a favorable manner. On the other hand, in the region where the image luminance is low, the contrast of the pattern light is low, and the noise component is relatively large. If the noise component is large, the measurement accuracy decreases. Further, in the spatial coding method, decoding is failed, and the direction of emission from the projection apparatus is erroneously determined. This causes a large measurement error. To reduce a measurement error, it is necessary to reduce noise. One of such noise reduction methods is a spatial smoothing process.

Japanese Patent Application Laid-Open No. 2004-191198 discusses a method for performing edge detection in an image of a target object onto which measurement pattern light is projected, and changing the size of a noise reduction filter based on the number of the detected edges.

If the method of Japanese Patent Application Laid-Open No. 2004-191198 is used, it is desirable to detect only edges in a boundary portion of the pattern light and count the number of the detected edges. However, an edge is detected in a portion other than the boundary portion of the pattern light in the following cases. First, a measurement scene includes the boundary between surfaces, the directions of the surfaces are different, and therefore, the amounts of reflected light are different. Second, the target object has texture, and therefore, the amount-of-reflected-light distribution of a surface is locally different. Thus, it is not possible to appropriately count the number of edges. Further, in such cases, it is difficult to determine an appropriate filter size.

According to the present application, even in a case where the amount-of-reflected-light distribution of a surface is locally different, an appropriate filter is applied to an image, whereby it is possible to measure a distance with higher accuracy.

SUMMARY OF THE INVENTION

According to an aspect of the present disclosure, a distance measurement apparatus includes an image acquisition unit configured to acquire a first captured image obtained by capturing a measurement target object onto which a measurement pattern is projected, and a second captured image obtained by capturing the measurement target object irradiated with approximately uniform illumination, a smoothing filter determination unit configured to, based on the second captured image, determine a smoothing filter to be applied to the first captured image, a smoothing filter application unit configured to apply the smoothing filter determined by the smoothing filter determination unit to the first captured image, and a measurement unit configured to measure a distance from the measurement target object based on the first captured image to which the smoothing filter is applied by the smoothing filter application unit.

According to another aspect of the present disclosure, a distance measurement apparatus includes an image acquisition unit configured to acquire a first captured image obtained by capturing a measurement target object onto which a measurement pattern is projected, and a second captured image obtained by capturing the measurement target object irradiated with approximately uniform illumination, a smoothing filter application unit configured to apply a smoothing filter to the first captured image, and a measurement unit configured to measure a distance from the measurement target object based on the first captured image to which the smoothing filter is applied by the smoothing filter application unit, wherein a size of the smoothing filter to be applied by the smoothing filter application is determined based on the second captured image.

According to other aspects of the present disclosure, one or more additional distance measuring apparatuses, one or more distance measuring methods and one or more mediums are discussed herein. Further features of the present disclosure will become apparent from the following description of exemplary embodiments with reference to the attached drawings.

BRIEF DESCRIPTION OF THE DRAWINGS

FIG. 2 is a flowchart of a distance measurement process by a spatial coding method.

FIGS. 3A to 3J are diagrams each illustrating a 4-bit projection pattern in the spatial coding method.

FIG. 4 is a diagram illustrating 4-bit Gray codes.

FIG. 5 is a diagram illustrating a principle of a distance measurement based on triangulation.

FIG. 6 is a flowchart of a smoothing filter determination process according to the first exemplary embodiment.

FIG. 7 is a flowchart of a smoothing filter application process according to the first exemplary embodiment.

FIG. 8 is a flowchart of a smoothing filter determination process according to a second exemplary embodiment.

FIG. 9 is a flowchart of a smoothing filter determination process according to a third exemplary embodiment.

FIG. 11 is a flowchart of a smoothing filter application process according to the fourth exemplary embodiment.

FIGS. 12A to 12F are examples of a target scene and a smoothing filter determined according to a pixel of interest.

DESCRIPTION OF THE EMBODIMENTS

An information processing apparatus according to exemplary embodiments of the present disclosure will be described in detail below.

Figure 13:
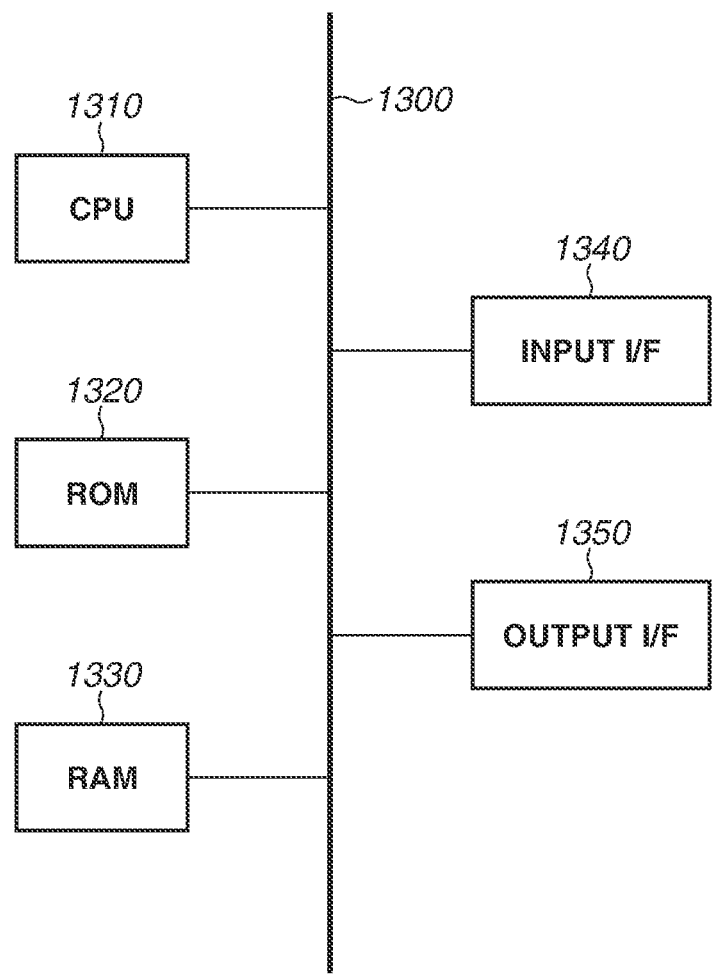
FIG. 13 is a diagram illustrating an example of a hardware configuration of an information processing apparatus according to the present disclosure.

Prior to the description of the exemplary embodiments of the present disclosure, with reference to FIG. 13, a description is given of a hardware configuration in which the information processing apparatus according to each exemplary embodiment is implemented.

FIG. 13 is a hardware configuration diagram of a distance measurement apparatus 3 according to the present exemplary embodiment. In FIG. 13, a central processing unit (CPU) 1310 performs overall control of each device connected to the CPU 1310 via a bus 1300. The CPU 1310 reads and executes a processing step and a program stored in a read-only memory (ROM) 1320. An operating system (OS), each processing program according to the present exemplary embodiment, and a device driver are stored in the ROM 1320, temporarily stored in a random-access memory (RAM) 1330, and appropriately executed by the CPU 1310. Further, an input interface (I/F) 1340 inputs from an external apparatus (an imaging apparatus, a display apparatus, or an operation apparatus) an input signal in a format that can be processed by the distance measurement apparatus 3. Further, an output I/F 1350 outputs to an external apparatus (a display apparatus) an output signal in a format that can be processed by the display apparatus.

Figure 1:
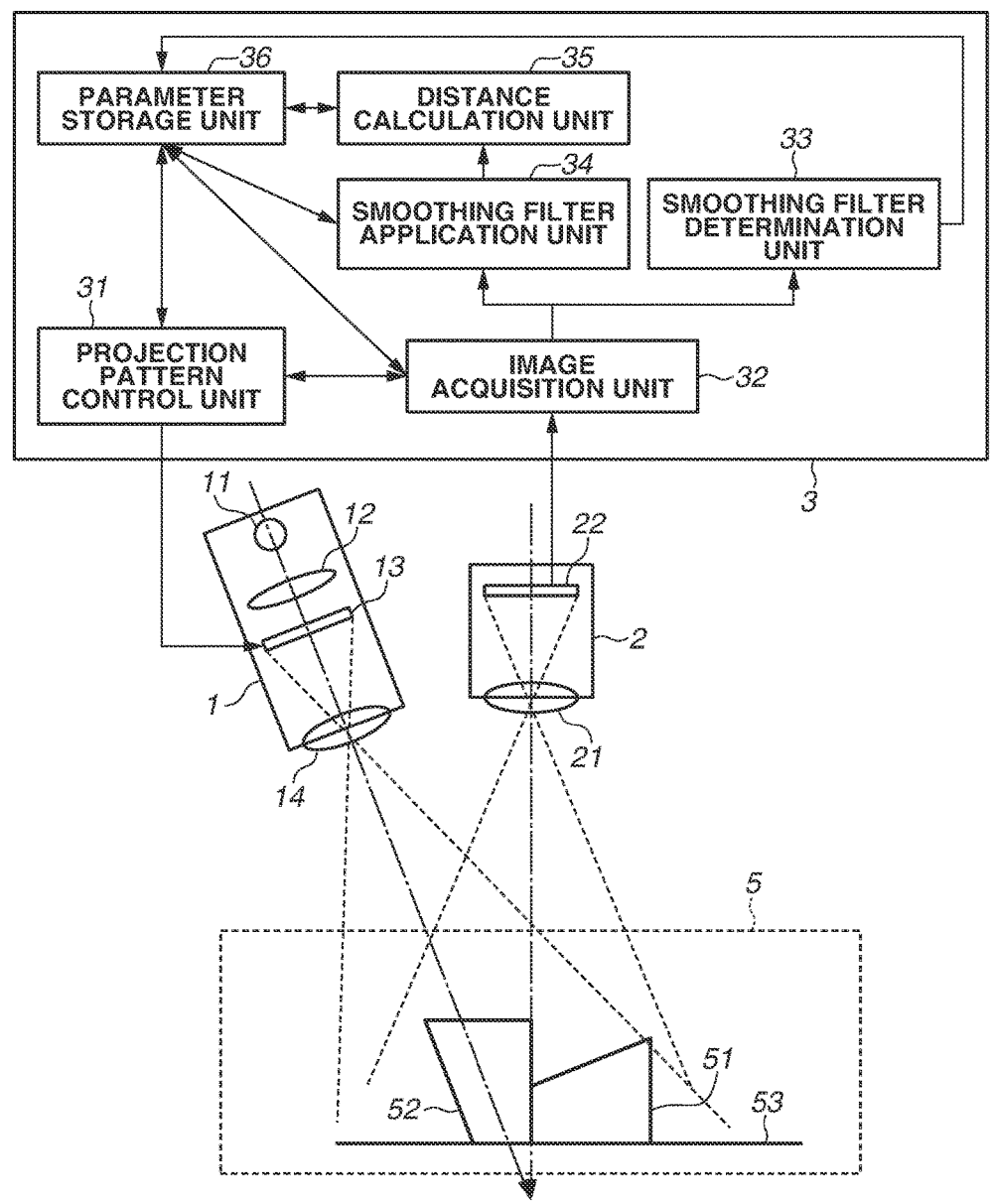
FIG. 1 is a diagram illustrating a general configuration of a distance measurement apparatus according to a first exemplary embodiment.

FIG. 1 illustrates a schematic diagram of the basic configuration of a system using the distance measurement apparatus 3 according to a first exemplary embodiment of the present disclosure.

The distance measurement apparatus 3 is connected to a projection unit 1, which projects pattern light onto a measurement target object, and an image capture unit 2, which captures the measurement target object onto which the pattern light is projected. The distance measurement apparatus 3 controls the projection unit 1 and the image capture unit 2 to perform a calculation process on captured image data and measure the three-dimensional distance of the measurement target object. The measurement target object includes measurement target objects 51, 52, and 53, which are collectively referred to as a measurement target scene 5.

The projection unit 1 includes a light source 11, an illumination optical system 12, a display element 13, and a projection optical system 14. As the light source 11, various light-emitting elements, such as a halogen lamp and a light-emitting diode (LED) can be used. The illumination optical system 12 is an optical system having the function of guiding light emitted from the light source 11 to the display element 13. In this process, it is desirable that when the light emitted from the light source 11 is made incident on the display element 13, the incidence luminance distribution should be uniform. Thus, for example, an optical system suitable for uniformizing a luminance distribution, such as Köhler illumination or a diffusion plate, is used. As the display element 13, a transmissive liquid crystal display (LCD), reflective liquid crystal on silicon (LCOS), or a reflective digital micromirror device (DMD) is used. The display element 13 has the function of, when the light from the illumination optical system 12 is guided to the projection optical system 14, spatially controlling the transmittance or the reflectance of the light. The projection optical system 14 is an optical system configured to cause the display element 13 to form an image at a particular position in the measurement target objects.

The image capture unit 2 includes an imaging lens 21 and an image sensor 22. The imaging lens 21 is an optical system configured to form an image of the particular position in the measurement target objects on the image sensor 22. As the image sensor 22, various photoelectric conversion elements, such as a complementary metal-oxide-semiconductor (CMOS) sensor and a charge-coupled device (CCD) sensor are used.

A projection pattern control unit 31 generates a projection pattern and stores the projection pattern in a storage device in advance.

Further, the projection pattern control unit 31 reads data of a stored projection pattern where necessary and transmits the data of the projection pattern to the projection unit 1 via a general-purpose display interface, such as a Digital Visual Interface (DVI). Further, the projection pattern control unit 31 has the function of controlling the operation of the projection unit 1 via a general-purpose communication interface, such as an RS232C interface or an Institute of Electrical and Electronics Engineers (IEEE) 488 interface. In this case, the display interface and the communication interface are examples of the output I/F 1350. The projection unit 1 displays the projection pattern on the display element 13 based on the projection pattern data.

An image acquisition unit 32 obtains a digital image signal sampled and quantized by the image capture unit 2. Further, the image acquisition unit 32 has the function of acquiring image data represented by the image luminance value (the density value) of each pixel from the obtained image signal and storing the image data in a memory. The image acquisition unit 32 has the function of controlling the operation (for example, the timing of capturing an image) of the image capture unit 2 via a general-purpose communication interface, such as an RS232C interface or an IEEE 488 interface.

The image acquisition unit 32 and the projection pattern control unit 31 operate cooperatively with each other. When the display of a pattern on the display element 13 is completed, the projection pattern control unit 31 sends a signal to the image acquisition unit 32. When receiving the signal from the projection pattern control unit 31, the image acquisition unit 32 causes the image capture unit 2 to operate, whereby image capturing is performed. When image capturing is completed, the image acquisition unit 32 sends a signal to the projection pattern control unit 31. When receiving the signal from the image acquisition unit 32, the projection pattern control unit 31 switches the projection pattern to be displayed on the display element 13 to the next projection pattern. The above process is sequentially repeated, whereby all projection patterns are captured.

A smoothing filter determination unit 33 determines a smoothing filter based on an image of the measurement target objects irradiated with approximately uniform illumination. A smoothing filter application unit 34 applies the smoothing filter determined by the smoothing filter determination unit 33 to a captured image of the measurement target objects onto which measurement pattern light is projected. Although the smoothing filter determination unit 33 and the smoothing filter application unit 34 will be described in detail later, the smoothing filter determined in the present disclosure is a smoothing filter for preserving as much of an edge (a boundary) in an image as possible. That is, the size of the smoothing filter is determined so as not to cross the edge in the image.

A distance calculation unit 35 calculates the distance from the measurement target objects based on a pattern image to which a smoothing filter is applied by the smoothing filter application unit 34. In the first exemplary embodiment, as illustrated in FIGS. 3A to 3J, a known measurement technique termed a spatial coding method for measuring a distance using projection patterns each including a light portion and a dark portion. As illustrated in FIGS. 3A to 3J, each projection pattern has a cyclic nature. However, the measurement technique to which the present disclosure can be applied is not limited to the spatial coding method.

A parameter storage unit 36 stores parameters required to calculate the three-dimensional distance of the measurement target objects. The parameters include device parameters for the projection unit 1 and the image capture unit 2, internal parameters for the projection unit 1 and the image capture unit 2, external parameters for the projection unit 1 and the image capture unit 2, and smoothing filter information. Specifically, the device parameters are the number of pixels of the display element 13 and the number of pixels of the image sensor 22. The internal parameters for the projection unit 1 and the image capture unit 2 are a focal length, an image center, and a coefficient for image distortion. These parameters are calculated by calibrating the internal parameters. The external parameters for the projection unit 1 and the image capture unit 2 are a translation vector and a rotation matrix that represent the relative positional relationship between the projection unit 1 and the image capture unit 2. These parameters are calculated by calibrating the external parameters.

As the smoothing filter information, information determined by the smoothing filter determination unit 33 is stored. This information is referenced by the smoothing filter application unit 34.

Each function unit included in the distance measurement apparatus 3 is achieved in such a manner that the CPU 1310 loads a program stored in the ROM 1320 into the RAM 1330 and executes processing according to each flowchart described later. Further, for example, to configure hardware as an alternative for a software process using the CPU 1310, a calculation unit and a circuit that correspond to the processing of each function unit may be configured.

The principle of the distance measurement by the spatial coding method is described.

As illustrated in FIG. 2, the distance measurement by the spatial coding method is divided into four main steps including a projection/capturing step S1, a smoothing filter application step S2, a decoding step S3, and a distance measurement step S4.

The projection/capturing step S1 includes steps S101 to S103.

In step S101, the projection unit 1 projects projection patterns illustrated in FIGS. 3A to 3J in order. In this example, 4-bit Gray code patterns in the spatial coding method (spatial coding patterns) are used. Thus, it is possible to divide light emitted from a projector into $2^4$ (=16) parts. In a case where the number of bits is increased, the number of projections increases. Accordingly, it is possible to increase the number of divisions of the emitted light. For example, in the case of 10 bits, it is possible to divide the emitted light into $2^{10}$ (=1024) parts.

In step S102, the image capture unit 2 captures images of the measurement target objects onto which the projection patterns are projected in step S101. Then, the image acquisition unit 32 sequentially acquires the images captured by the image capture unit 2.

In step S103, the image acquisition unit 32 determines whether image capturing for all the projection patterns is completed. In a case where image capturing of all the projection patterns is completed, the processing proceeds to the smoothing filter application step S2. In a case where image capturing of all the projection patterns is not completed, the processing returns to the projection of the patterns in step S101.

The smoothing filter application step S2 includes steps S201 and S202.

In step S201, the smoothing filter determination unit 33 determines a smoothing filter. In a normal spatial coding method, in order to reduce noise, a smoothing filter of a constant size is selected regardless of the number of bits of the projection pattern or the position of the captured image. In the present exemplary embodiment, however, a smoothing filter suitable for each pixel (each predetermined region) in the captured images is determined. The specific processing will be described later. The smoothing filter determination unit 33 stores the selected smoothing filters in the parameter storage unit 36.

In step S202, the smoothing filter application unit 34 applies the smoothing filters to the captured images, thereby reducing image sensor noise. Specifically, the smoothing filter application unit 34 reads the smoothing filters stored in the parameter storage unit 36 and applies the smoothing filters to the images acquired from the image acquisition unit 32.

The decoding step S3 includes steps S301 to S306.

In step S301, the distance calculation unit 35 sets a control variable i to 1.

In step S302, the distance calculation unit 35 performs binarization determination of an image of an i-th bit corresponding to the control variable i. For example, if i=1, then based on a captured image obtained by projecting a 1-bit positive pattern in FIG. 3B and a captured image obtained by projecting a 1-bit negative pattern in FIG. 3G, the distance calculation unit 35 binarizes a 1-bit pattern. In the binarization determination process, the distance calculation unit 35 compares the image luminance values of a positive image and a negative image and determines that a pixel of which positive image has a greater image luminance value is 1, and a pixel of which negative image has a greater image luminance value is 0.

In step S303, the distance calculation unit 35 determines whether the control variable i is smaller than N. N is the number of least significant bits in the spatial coding method. A description is given here of the case where N is 4. If i is smaller than 4, the processing proceeds to step S304. In step S304, the distance calculation unit 35 adds 1 to the control variable i, and the processing returns to step S302. If i is equal to or greater than N, the distance calculation unit 35 breaks out of the loop, and the processing proceeds to step S305.

In step S305, the distance calculation unit 35 generates 4-bit Gray codes. Before the processing proceeds to step S305, binarization is performed from 1 bit to 4 bits. These binarization results are placed in order, thereby generating 4-bit Gray codes as illustrated in FIG. 4.

In step S306, the distance calculation unit 35 converts the 4-bit Gray codes generated in step S305 into 4-bit spatial codes. The conversion of the Gray codes into the spatial codes enables the understanding of the direction of emission from the projection unit 1. Then, the processing proceeds to the distance measurement step S4.

The distance measurement step S4 includes step S401.

As illustrated in FIG. 5, based on the direction of emission from the projection unit 1 and the direction of incidence on the image capture unit 2, a distance is measured according to the principle of triangulation. To obtain the direction of incidence on the image capture unit 2 from information of the pixels in the captured images, the internal parameters for the image capture unit 2 are used. Similarly, to obtain the direction of emission from information of the pixels of the display element 13, the internal parameters for the projection unit 1 are used. When a distance is measured according to the principle of triangulation, the external parameters for the image capture unit 2 and the projection unit 1 are also used. The details are not described here.

This is the principle of the distance measurement using the spatial coding method.

In the spatial coding method, binarization is performed based on the relative size relationship between a positive pattern and a negative pattern in each bit. If image sensor noise is large relative to the size of the image luminance waveform of a projection pattern, an error may occur in the binarization determination. If an error occurs in the determination of binarization, the direction of emission from the projection unit 1 is erroneously determined. This leads to a large distance measurement error.

Further, in a distance measurement method based on the intersection position of the image luminance waveforms of a positive pattern and a negative pattern, the accuracy of calculating the intersection position deteriorates due to noise. The present disclosure relates to a smoothing filter for reducing an error in the binarization determination and reducing the deterioration of the accuracy of calculating the intersection position due to noise.

A detailed description is given of the smoothing filter determination unit 33 and the smoothing filter application unit 34, which are characteristic components of the present disclosure. In the above description of the principle of the spatial coding method with reference to FIG. 2, it has been stated that a smoothing filter is of a constant size. In the present exemplary embodiment, in the smoothing filter determination process in step S201, a smoothing filter suitable for each pixel in the captured images is determined. In step S202, the smoothing filter suitable for each pixel determined in step S201 is applied.

The smoothing filter determination process in step S201 is performed by the smoothing filter determination unit 33. The smoothing filter determination unit 33 determines a smoothing filter based on an image of the measurement target objects irradiated with approximately uniform illumination. The projection unit 1 irradiates an entirely lighted image illustrated in FIG. 3A, whereby it is possible to achieve approximately uniform illumination. As another method for achieving approximately uniform illumination, there is a method for using light from an environment light source (not illustrated) present around the measurement apparatus. If the light from the environment light source can be regarded as being approximately uniform, it is possible to use the light as approximately uniform illumination.

In the first exemplary embodiment, a smoothing filter termed an edge-preserving smoothing filter is used. A general smoothing filter can reduce components, such as the noise component, included in an image, but also smoothes an edge intrinsically present in the image at the same time. An edge-preserving smoothing filter can smooth a minute fluctuation due to the noise component and the like while maintaining an edge in an image.

If a general smoothing filter is applied to an image for a distance measurement, the general smoothing filter may not only make an edge in the image smooth, but also perform smoothing across the boundary between objects. In such a case, smoothing filtering is performed between objects having different heights. This may cause an error in a spatial code and cause a false shape in the measurement result.

In the first exemplary embodiment, to prevent smoothing filtering from being performed across the boundary between objects, an image irradiated with approximately uniform illumination is used. The boundary between the objects is observed as a change in the amount-of-reflected-light distribution, that is, a change in the image luminance value. The change in the image luminance value appears as an edge in the image. That is, an edge-preserving smoothing filter is obtained using an image of the measurement target objects irradiated with approximately uniform illumination and is applied to a measurement pattern light image, whereby it is possible to reduce application of a smoothing filter across the boundary between objects. Consequently, it is possible to prevent a false shape from being included in the distance measurement result.

FIG. 6 illustrates a flowchart of the smoothing filter determination flow according to the first exemplary embodiment.

In step S601, the smoothing filter determination unit 33 sets the y-coordinate value of image coordinates (x, y) to 1.

In step S602, the smoothing filter determination unit 33 sets the x-coordinate value of the image coordinates (x, y) to 1.

In step S603, the smoothing filter determination unit 33 acquires an image luminance value Ib of the image coordinates (x, y).

In step S604, the smoothing filter determination unit 33 sets a filter control variable fy to −Fy. In the present exemplary embodiment, a filter size is (2×Fy+1) pixels in the y-direction of the image and (2×Fx+1) pixels in the x-direction of the image.

In step S605, the smoothing filter determination unit 33 sets a filter control variable fx to −Fx.

In step S606, the smoothing filter determination unit 33 acquires an image luminance value In of image coordinates (x+fx, y+fy) of a surrounding pixel around the image coordinates (x, y). If x+fx or y+fy comes out of the image, the smoothing filter determination unit 33 ignores this pixel.

In step S607, the smoothing filter determination unit 33 calculates an absolute value Id of the difference between the image luminance Ib of the image coordinates (x, y) and the image luminance In of the image coordinates (x+fx, y+fy) of the surrounding pixel using the following formula (1):

$$Id = abs(In - Ib) \qquad \text{formula (1)}.$$

In formula (1), abs ( ) is a function that returns the absolute value of the numerical value in the parentheses.

In step S608, the smoothing filter determination unit 33 compares the relative magnitude between the absolute value Id of the difference between the image luminances Ib and In calculated in step S607 and a threshold set in advance. If Id is smaller than the threshold, the processing proceeds to step S609. If Id is equal to or greater than the threshold, the processing proceeds to step S610.

In step S609, since the difference between the image luminances Ib and In is smaller than the threshold, and it is determined that this pixel is not the boundary between measurement target objects, the smoothing filter determination unit 33 determines (fx, fy) as a smoothing calculation target pixel.

In step S610, since the difference between Ib and In is equal to or greater than the threshold in contrast to step S609, and it is determined that this pixel is the boundary between measurement target objects, the smoothing filter determination unit 33 excludes (fx, fy) from smoothing calculation target pixels.

In step S611, the smoothing filter determination unit 33 determines whether fx reaches Fx, which is the final position in the filter size in the x-direction. If fx<Fx holds true, that is, fx does not reach Fx, the processing proceeds to step S612. In step S612, the smoothing filter determination unit 33 adds 1 to fx. If, on the other hand, fx<Fx does not hold true, that is, fx reaches Fx, the processing proceeds to step S613.

In step S613, the smoothing filter determination unit 33 determines whether fy reaches Fy, which is the final position in the filter size in the y-direction. If fy<Fy holds true, that is, fy does not reach Fy, the processing proceeds to step S614. In step S614, the smoothing filter determination unit 33 adds 1 to fy. If, on the other hand, fy<Fy does not hold true, that is, fy reaches Fy, the processing proceeds to step S615.

In step S615, the smoothing filter determination unit 33 determines a smoothing filter for the image coordinates (x, y). That is, it is clear which pixels in the filter size of (2×Fx+1)×(2×Fy+1) are smoothing filter calculation targets. If the number of the smoothing filter calculation target pixels is M, the kernel value of the smoothing filter calculation target pixels is 1/M. This information about the smoothing filter for each pixel is stored in the parameter storage unit 36. Then, the processing proceeds to step S616.

In step S616, the smoothing filter determination unit 33 determines whether x reaches W, which is the image size in the horizontal direction. If x<W holds true, that is, x does not reach W, the processing proceeds to step S617. In step S617, the smoothing filter determination unit 33 adds 1 to x. If x reaches W, the processing proceeds to step S618.

In step S617, the smoothing filter determination unit 33 adds 1 to the x-coordinate value of the image coordinates (x, y). Then, the processing returns to step S603.

In step S618, the smoothing filter determination unit 33 determines whether y reaches H, which is the image size in the vertical direction. If y<H holds true, that is, y does not reach H, the processing proceeds to step S619. In step S619, the smoothing filter determination unit 33 adds 1 to y. If y reaches H, the processing ends.

In step S619, the smoothing filter determination unit 33 adds 1 to the y-coordinate value of the image coordinates (x, y). Then, the processing returns to step S602.

This is the flow of the edge-preserving smoothing filter determination process in step S201.

FIGS. 12A to 12F are diagrams illustrating examples of the measurement target scene 5 and a smoothing filter determined according to a pixel of interest. FIGS. 12A, 12C, and 12E each represent the position of a pixel of interest and the range of surrounding pixels around the position of the pixel of interest in an image obtained by capturing the measurement target scene 5. FIGS. 12B, 12D, and 12F represent edge-preserving smoothing filters determined at the positions of the respective pixels of interest.

In the case of FIG. 12A, the entirety of a surrounding pixel region including a pixel of interest falls within the measurement target object 52. In such a case, even if a general smoothing filter is applied, a change in the amount of reflected light in the measurement target object 52 is small. Thus, a great problem does not arise. Even if an edge-preserving smoothing filter is obtained, the amount of change between the image luminance values of the pixel of interest and each of the surrounding pixels is small. Thus, as illustrated in FIG. 12B, all the surrounding pixels are regarded as smoothing calculation target pixels. The edge-preserving smoothing filter is obtained as being the same as the general smoothing filter.

In the case of FIG. 12C, a pixel of interest and surrounding pixels on the right side are present on the measurement target object 51, while surrounding pixels on the left side are present on the measurement target object 52. In such a case, if a general smoothing filter is applied, smoothing filtering is performed across measurement target objects. This may cause a false shape in the measurement result. If, on the other hand, the edge-preserving smoothing filter determination flow according to the present disclosure is used, the amount of change between the image luminance values of the pixel of interest and each of the surrounding pixels on the measurement target object 52 becomes large. Thus, the surrounding pixels on the left side are excluded from smoothing filter calculation targets. Accordingly, an edge-preserving smoothing filter is determined such that as illustrated in FIG. 12D, only the pixels from and to the right of the pixel of interest are smoothing filter calculation target pixels. That is, a smoothing filter is not applied across the boundary between objects having different heights, namely the measurement target objects 51 and 52. Thus, it is possible to prevent a false shape from being included in the measurement result.

In the case of FIG. 12E, a pixel of interest and surrounding pixels on the upper left side are present on the measurement target object 52, while surrounding pixels on the upper right side are present on the measurement target object 51, and surrounding pixels on the lower side are present on the measurement target object 53. In such a case, if a general smoothing filter is applied, a smoothing filter is applied across measurement target objects. This may cause a false shape in the measurement result. Meanwhile, the amount of change between the image luminance value of the pixel of interest and the image luminance value of each pixel on the measurement target object 51 is large. Similarly, the amount of change between the image luminance value of the pixel of interest and the image luminance value of each pixel on the measurement target object 53 is also large. Thus, if the edge-preserving smoothing filter determination flow according to the present disclosure is used, an edge-preserving smoothing filter is determined such that as illustrated in FIG. 12F, only the pixels from and to the upper left of the pixel of interest are smoothing filter calculation target pixels. That is, a smoothing filter is applied only in the range of the measurement target object 52. Thus, a smoothing filter is not applied across the boundary between objects. It is therefore possible to prevent a false shape from occurring in the measurement result.

If a smoothing filter termed an edge-preserving smoothing filter is used, a method other than the above method can also be applied to the present disclosure. For example, a k-closest averaging filter and a bilateral filter can be used. The k-closest averaging filter selects, in a region near a pixel of interest, a certain number of pixels having luminance values close to the image luminance value of the pixel of interest and outputs the average value of the image luminance values of the selected pixels. The bilateral filter performs weighted averaging according to the Gaussian distribution based on the differences between the image luminance values of a pixel of interest and surrounding pixels.

A description is given below of the difference between a normal edge-preserving smoothing filter and an edge-preserving smoothing filter according to the present disclosure. In the case of the normal edge-preserving smoothing filter, an image based on which the filter is determined and an image to which the filter is applied are the same. The present disclosure is characterized in that an image based on which the filter is determined (a second captured image) and an image to which the filter is applied (a first captured image) are different. The image to which the smoothing filter is applied is a measurement pattern image.

In a three-dimensional measurement by an active method, measurement pattern light including a change in the density is projected onto the measurement target objects. As described above, an edge in an image resulting from the difference in level at the boundary between measurement target objects occurs due to a change in the amount-of-reflected-light distribution. If, however, an attempt is made to obtain an edge-preserving smoothing filter in the situation where the measurement pattern light is projected, the change in the density of the measurement pattern light is also included. Thus, it is difficult to appropriately obtain the change resulting from the amount-of-reflected-light distribution of the measurement target objects. In the present disclosure, an edge-preserving smoothing filter is obtained based on an image of the measurement target objects irradiated with approximately uniform illumination, and the obtained edge-preserving smoothing filter is applied to a captured image of the target objects onto which measurement pattern light is projected. Consequently, it is possible to determine a smoothing filter which is not influenced by the change in the density of the measurement pattern light.

The smoothing filter application process in step S202 is performed by the smoothing filter application unit 34. FIG. 7 illustrates a flowchart of the smoothing filter application flow according to the first exemplary embodiment.

In step S701, the smoothing filter application unit 34 sets a control variable j to 1.

In step S702, the smoothing filter application unit 34 sets a smoothing target to a j-th pattern image.

In step S703, the smoothing filter application unit 34 sets the y-coordinate value of image coordinates (x, y) to 1.

In step S704, the smoothing filter application unit 34 sets the x-coordinate value of the image coordinates (x, y) to 1.

In step S705, the smoothing filter application unit 34 acquires a smoothing filter for the image coordinates (x, y). The smoothing filter for each pixel is determined by the smoothing filter determination unit 33 and stored in the parameter storage unit 36.

In step S706, the smoothing filter application unit 34 performs a smoothing process on the image coordinates (x, y) based on the smoothing filter acquired in step S705. Based on the kernel value of the smoothing filter, the smoothing filter application unit 34 calculates the sum of products of the image luminance value of the image coordinates (x, y) and the image luminance values of surrounding pixels.

In step S707, the smoothing filter application unit 34 determines whether x reaches W, which is the image size in the horizontal direction. If x<W holds true, that is, x does not reach W, the processing proceeds to step S708. In step S708, the smoothing filter application unit 34 adds 1 to x. If x reaches W, the processing proceeds to step S709.

In step S709, the smoothing filter application unit 34 determines whether y reaches H, which is the image size in the vertical direction. If y<H holds true, that is, y does not reach H, the processing proceeds to step S710. In step S710, the smoothing filter application unit 34 adds 1 to y. If y reaches H, the processing proceeds to step S711.

In step S711, the smoothing filter application unit 34 completes the application of the smoothing filters to all the pixels in the j-th image. Then, the processing proceeds to step S712.

In step S712, the smoothing filter application unit 34 determines whether the application of the smoothing filters to all the pattern images is completed. If the application of the smoothing filters to all the pattern images is not completed, the processing proceeds to step S713. In step S713, the smoothing filter application unit 34 adds 1 to j and applies smoothing filters to the next image. If the processing on all the pattern images is completed, the processing ends.

This is the flow of the smoothing filter application process in step S202.

In the first exemplary embodiment, an edge-preserving smoothing filter is determined based on a captured image of measurement target objects irradiated with approximately uniform illumination, and the smoothing filter is applied to a captured image of the measurement target objects irradiated with the measurement pattern light. Consequently, it is possible to perform a smoothing process in a range that does not include the boundary between objects. Thus, it is possible to both reduce noise and prevent a false shape from occurring in the measurement result, whereby a distance measurement with high accuracy can be achieved.

In the first exemplary embodiment, an example has been described where the present disclosure is applied to the spatial coding method. As described above, however, the measurement technique to which the present disclosure can be applied is not limited to the spatial coding method.

In a phase shift method, a plurality of beams of pattern light are projected while the intensity of a projection pattern is modulated into a sinusoidal shape, and the phase of the intensity is shifted. For example, if the phase is shifted by $\pi/2$ each time, four patterns are projected. The luminance of each pixel in images obtained by capturing the plurality of beams of pattern light is approximated to a sinusoidal wave, whereby the phase of the luminance is calculated. A distance is measured based on information of the calculated phase. At this time, if the signal-to-noise (SN) ratio is poor, a sinusoidal wave approximation error becomes large. Thus, an error occurs in the calculated phase, and an error also occurs in the distance measurement result.

In a case where the present disclosure is applied to the phase shift method, then in a second exemplary embodiment, an edge-preserving smoothing filter is applied to each image obtained by capturing the projection pattern of which intensity is modulated into the sinusoidal shape. The same filter is applied to each pixel. Thus, there is no adverse influence on the calculation of the phase, and it is also possible to achieve noise reduction.

A schematic diagram of the basic configuration of the distance measurement apparatus 3 according to the second exemplary embodiment is similar to that according to the first exemplary embodiment illustrated in FIG. 1, except that the processing of the smoothing filter determination unit 33 is different.

In the second exemplary embodiment, based on the image luminance value of an image of target objects irradiated with approximately uniform illumination, the smoothing filter determination unit 33 determines the size of the smoothing filter to be applied to a measurement pattern image.

Generally, the lower the image luminance value, the lower the SN ratio. That is, the lower the image luminance value of an area, the stronger the noise reduction process that needs to be applied to the area. Thus, it is necessary to increase the size of the smoothing filter. On the other hand, in an area where the image luminance is high, the SN ratio is also high. Thus, a sufficient noise reduction effect can be obtained even using a smoothing filter of a small size. Conversely, the use of a large smoothing filter in an area where the SN ratio is high may cause a false shape.

That is, in the second exemplary embodiment, the size of the smoothing filter is changed based on the absolute value of the image luminance value.

FIG. 8 illustrates a flowchart of the process of determining a smoothing filter.

Steps S801, S802, and S803 are similar to steps S601, S602, and S603, respectively, in the first exemplary embodiment and therefore are not described here.

In step S820, based on the image luminance value Ib of the image coordinates (x, y) acquired in step S803, the smoothing filter determination unit 33 determines Fx and Fy. As described above, the greater the value Ib, the higher the SN ratio. Thus, Fx and Fy are determined to be small. The smaller the value Ib, the greater the values Fx and Fy are determined to be. When Fx and Fy are determined, the processing proceeds to step S815.

In step S815, the smoothing filter determination unit 33 determines a smoothing filter for the image coordinates (x, y) based on Fx and Fy determined in step S820 and stores the smoothing filter in the parameter storage unit 36. When the storage of the smoothing filter in the parameter storage unit 36 is completed, the processing proceeds to step S816.

Steps S816 to S819 are similar to steps S616 to S619, respectively, in the first exemplary embodiment and therefore are not described in detail here. The smoothing filter determination unit 33, however, determines a smoothing filter while performing raster scan on the image, and therefore, smoothing filters for all the pixels in the image are determined.

This is the flow for determining a smoothing filter according to the second exemplary embodiment.

For ease of description, a description has been given on the assumption that the shape of the filter is a rectangular shape. However, the shape of the filter with which the present disclosure is effective is not limited to a rectangular shape. For example, pixels near the vertices of the rectangular shape may be excluded, or the shape of the filter may be an approximately circular shape.

Further, an example has been described where the size of the smoothing filter is determined based on the image luminance value of an image of the measurement target objects irradiated with approximately uniform illumination. Alternatively, the size of the smoothing filter may be determined based on a pattern light intensity value calculated from the difference value between an entirely lighted image and an entirely light-off image. In such a case, in a region where the pattern light intensity is high, the SN ratio is high. Thus, the size of the smoothing filter is determined to be small. In a region where the pattern light intensity is low, the SN ratio is low. Thus, the size of the smoothing filter is determined to be large.

Further, the image luminance value of an entirely light-off image represents an environmental light component. The environmental light component increases noise in a biased manner. Thus, if the environmental light component is added as a factor in determining the size of the filter, it is possible to determine the filter size more effectively.

Also in the second exemplary embodiment, the size of the smoothing filter is determined based on the relative magnitude of the image luminance value of an approximately uniform image. Thus, it is possible to both reduce noise and prevent a false shape from occurring in the measurement result.

A schematic diagram of the basic configuration of the distance measurement apparatus 3 according to a third exemplary embodiment is similar to that according to the first exemplary embodiment illustrated in FIG. 1, except that the processing of the smoothing filter determination unit 33 is different.

In the third exemplary embodiment, based on the image luminance of a pixel of interest in an image of target objects irradiated with approximately uniform illumination, the smoothing filter determination unit 33 determines the size of the smoothing filter and further obtains an edge-preserving smoothing filter from the image luminance values of surrounding pixels.

FIG. 9 illustrates a flowchart of the process of determining a smoothing filter. This flow is different from the flow according to the second exemplary embodiment described with reference to FIG. 7, in that step S920 is added.

In step S920, according to the image luminance value Ib of the image coordinates (x, y) acquired in step S903, the smoothing filter determination unit 33 determines Fx and Fy, which are parameters regarding the size of the smoothing filter.

As described in the second exemplary embodiment, in a pixel of which absolute value of the image luminance value is high, the SN ratio is high. Thus, Fx and Fy, which correspond to a search range for determining an edge-preserving smoothing filter, can be determined to be small. Thus, it is possible to omit a processing procedure when a smoothing filter is determined. The processing procedure is omitted, whereby it is possible to determine a smoothing filter faster than in the first exemplary embodiment.

This is the flow for determining an edge-preserving smoothing filter according to the third exemplary embodiment.

Also in the third exemplary embodiment, the size of the smoothing filter is determined based on the relative magnitude of the image luminance value of an image of the measurement target objects irradiated with approximately uniform illumination. Thus, it is possible to both reduce noise and prevent a false shape from occurring in the measurement result. Further, it is possible to shorten the processing time of the process of determining an edge-preserving smoothing filter.

In a fourth exemplary embodiment, the size of the smoothing filter to be applied is changed according to the cycle of the projection pattern image.

A schematic diagram of the basic configuration of the distance measurement apparatus 3 according to the fourth exemplary embodiment is similar to that according to the first exemplary embodiment illustrated in FIG. 1, except that the processing of the smoothing filter determination unit 33 and the smoothing filter application unit 34 is different.

In the first to third exemplary embodiments, the smoothing filter determined by the smoothing filter determination unit 33 is of a constant size, regardless of the cycle of the striped pattern of the measurement pattern light. If the size of the smoothing filter is larger than a single cycle of the light and dark of the striped pattern, the contrast of the pattern light significantly decreases. In response, in the fourth exemplary embodiment, if the size of the smoothing filter is larger than the cycle of the striped pattern of measurement pattern light, the size of the smoothing filter is reduced according to the cycle of the striped pattern. Specifically, the upper limit of the smoothing filter size is set to a size corresponding to a single cycle of the striped pattern of measurement pattern light on an image.

The smoothing filter determination unit 33 determines a plurality of smoothing filters according to the cycle of the striped pattern. Generally, the direction of the stripe of measurement pattern light is either the vertical direction or the horizontal direction. If the direction of the striped pattern is the vertical direction in an image, an upper limit is provided for the size of the smoothing filter in the horizontal direction. If, on the other hand, the direction of the striped pattern is the horizontal direction in an image, an upper limit is provided for the size of the smoothing filter in the vertical direction.

When those cases are represented by formulas, the case where the direction of the stripe is the vertical direction is represented by the following formula (2):

$$2 \times Fx + 1 = T \quad \text{formula (2), and}$$

the case where the direction of the stripe is the horizontal direction is represented by the following formula (3):

$$2 \times Fy + 1 = T \quad \text{formula (3).}$$

When formulas (2) and (3) are deformed, the following formulas (4) and (5) are obtained, respectively:

$$Fx = (T-1)/2 \quad \text{formula (4), and}$$

$$Fy = (T-1)/2 \quad \text{formula (5).}$$

Figure 10:
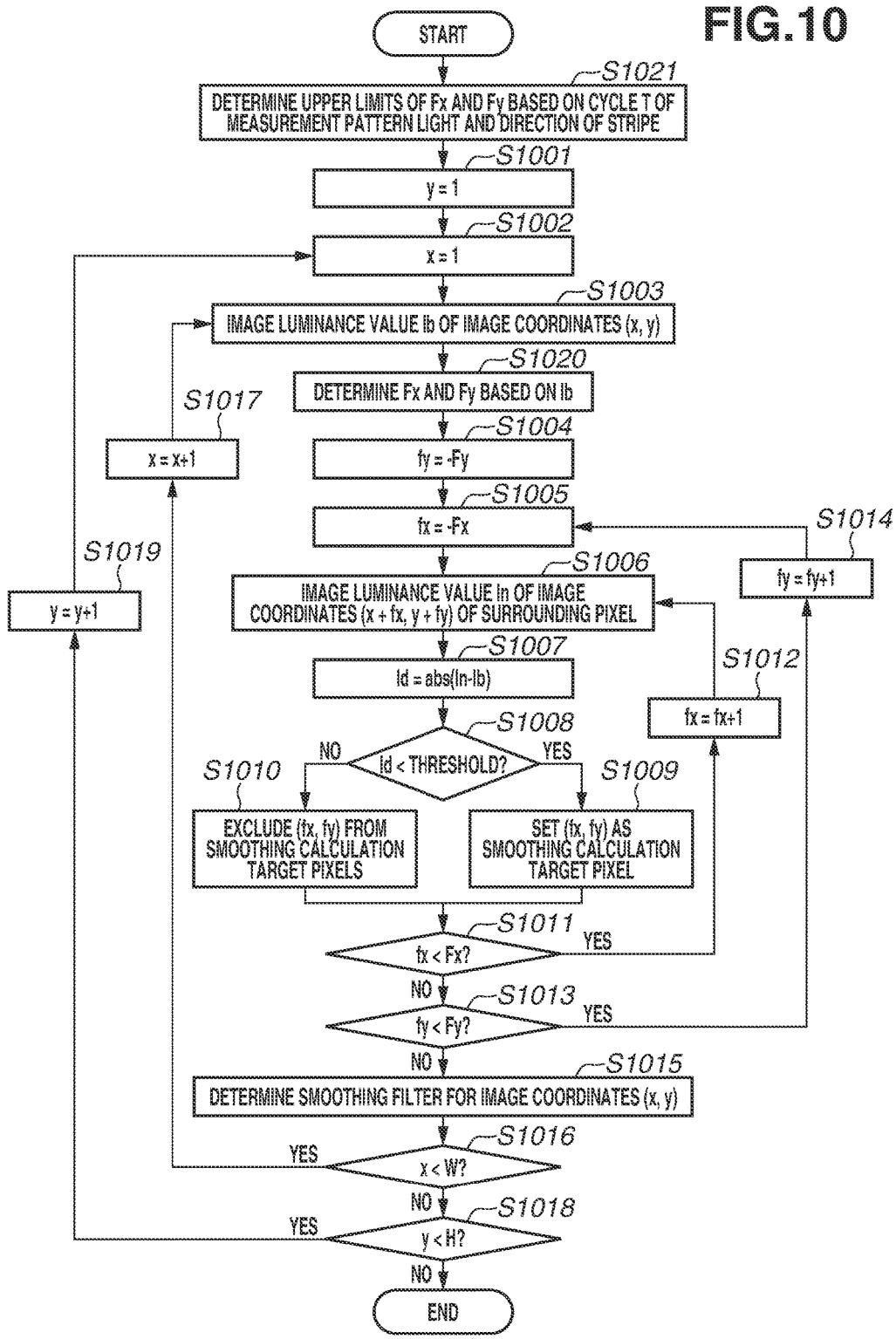
FIG. 10 is a flowchart of a smoothing filter determination process according to a fourth exemplary embodiment.

FIG. 10 illustrates a flowchart of the process of determining a smoothing filter. This flow is different from the flow according to the third exemplary embodiment described with reference to FIG. 9, in that step S1021 is added, and the process of step S1015 replaces that of step S915. The flow is described regarding only these two differences, and the other portions are not described here.

In step S1021, as described above, based on a cycle T and the direction of the stripe of measurement pattern light, the smoothing filter determination unit 33 sets the upper limits of Fx and Fy using the formulas (4) and (5).

In step S1015, since the smoothing filter is different depending on the cycle of the measurement pattern light, the smoothing filter determination unit 33 stores information of the smoothing filter in the parameter storage unit 36 with respect to each cycle.

This is the flow for determining an edge-preserving smoothing filter according to the fourth exemplary embodiment.

If the cycle T of the measurement pattern light is sufficiently large for the filter size of (2×Fx+1)×(2×Fy+1), which is determined based on the initial values of Fx and Fy, the size of the smoothing filter to be applied is a constant size. A plurality of smoothing filters may be obtained only in a case where the cycle T of the measurement pattern light has a lower bit projection pattern to the filter size.

The smoothing filter application unit 34 according to the fourth exemplary embodiment is described.

FIG. 11 illustrates the flow of a smoothing filter application process according to the fourth exemplary embodiment. This flow is different from the flow according to the first exemplary embodiment illustrated in FIG. 7, in that step S1114 is added, and the process of step S1115 replaces that of step S705.

The smoothing filter determination unit 33 according to the fourth exemplary embodiment changes smoothing filters depending on the cycle T of the measurement pattern light image. Thus, in step S1114, the smoothing filter determination unit 33 acquires the cycle T of a j-th pattern image in advance. Then, in step S1115, based on the image coordinates (x, y) and the acquired cycle T, the smoothing filter determination unit 33 acquires a smoothing filter from the parameter storage unit 36. In step S1106, the smoothing filter determination unit 33 applies the smoothing filters based on the acquired smoothing filters.

This is the flow of the smoothing filter application process according to the fourth exemplary embodiment.

In the fourth exemplary embodiment, an example has been described where the present disclosure is applied to the spatial coding method. Alternatively, the present disclosure can also be applied to the phase shift method. In the case of the phase shift method, the upper limit of the smoothing filter size is set to a size corresponding to a single cycle of sinusoidal pattern light on a captured image.

That is, the upper limit of the smoothing filter size is set to a size corresponding to a single cycle of pattern light to be projected, whereby the present disclosure can be applied to a three-dimensional measurement technique using various beams of projection pattern light.

The fourth exemplary embodiment is used, whereby even in a case where the cycle T of measurement pattern light is small, it is possible to achieve noise reduction in a state where a reduction in the contrast of the luminance waveform of projection pattern light is suppressed.

According to the present disclosure, even in a case where the amount-of-reflected-light distribution of a surface is locally different, an appropriate filter is applied to an image, whereby it is possible to measure a distance with higher accuracy.

OTHER EMBODIMENTS

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-061686, filed Mar. 24, 2015, which is hereby incorporated by reference herein in its entirety.

What is claimed is:

1. A distance measurement apparatus comprising:
an image acquisition unit configured to acquire a first captured image obtained by capturing a measurement target object onto which a measurement pattern is projected, and a second captured image obtained by capturing the measurement target object irradiated with approximately uniform illumination;
a smoothing filter determination unit configured to, based on the second captured image, determine a smoothing filter to be applied to the first captured image;
a smoothing filter application unit configured to apply the smoothing filter determined by the smoothing filter determination unit to the first captured image; and
a measurement unit configured to measure a distance from the measurement target object based on the first captured image to which the smoothing filter is applied by the smoothing filter application unit.

2. The distance measurement apparatus according to claim 1, wherein the smoothing filter determination unit determines the smoothing filter for each predetermined region in the second captured image, and
wherein the smoothing filter application unit applies the smoothing filter to each region included in the first captured image and corresponding to the respective predetermined region in the second captured image.

3. The distance measurement apparatus according to claim 1, wherein the smoothing filter determination unit determines the smoothing filter based on a luminance value of a pixel of interest in the second captured image and a luminance value of a surrounding pixel around the pixel of interest.

4. The distance measurement apparatus according to claim 3, wherein the smoothing filter determination unit determines the smoothing filter based on a difference value between the luminance value of the pixel of interest in the second captured image and the luminance value of the surrounding pixel around the pixel of interest.

5. The distance measurement apparatus according to claim 1, wherein the smoothing filter determination unit further determines a size of the smoothing filter.

6. The distance measurement apparatus according to claim 1, wherein the smoothing filter determination unit further determines a region including a pixel of interest in the second captured image and a pixel around the pixel of interest as a reference region for a smoothing filter to be applied to a pixel included in the first captured image and corresponding to the pixel of interest, a difference between luminance values of the pixel of interest and the pixel around the pixel of interest being in a predetermined range, and
wherein the smoothing filter application unit applies the smoothing filter to the first captured image based on the reference region determined by the smoothing filter determination unit.

7. The distance measurement apparatus according to claim 1, wherein the measurement pattern has a cyclic nature, and
wherein the smoothing filter determination unit sets an upper limit of a size of the smoothing filter based on a cycle of the measurement pattern in the first captured image.

8. The distance measurement apparatus according to claim 1, wherein the measurement pattern is a spatial coding pattern in which a light portion and a dark portion are repeated in a predetermined cycle, and
wherein the smoothing filter determination unit further determines a size of the smoothing filter to be smaller than a single cycle of the light portion and the dark portion of the measurement pattern in the second captured image.

9. The distance measurement apparatus according to claim 1, wherein the measurement pattern and the approximately uniform illumination light are projected or emitted by a same apparatus.

10. The distance measurement apparatus according to claim 1, wherein the first captured image and the second captured image are captured by a same imaging apparatus.

11. A distance measurement apparatus comprising:
an image acquisition unit configured to acquire a first captured image obtained by capturing a measurement target object onto which a measurement pattern is projected, and a second captured image obtained by capturing the measurement target object irradiated with approximately uniform illumination;
a smoothing filter application unit configured to apply a smoothing filter to the first captured image; and
a measurement unit configured to measure a distance from the measurement target object based on the first captured image to which the smoothing filter is applied by the smoothing filter application unit,
wherein a size of the smoothing filter to be applied by the smoothing filter application unit is determined based on the second captured image.

12. The distance measurement apparatus according to claim 11, wherein the size of the smoothing filter to be applied by the smoothing filter application unit is determined based on a luminance value of a pixel of interest in the second captured image and a luminance value of a surrounding pixel around the pixel of interest.

13. The distance measurement apparatus according to claim 11, wherein the size of the smoothing filter to be applied by the smoothing filter application unit is determined based on a difference value between a luminance value of a pixel of interest in the second captured image and a luminance value of a surrounding pixel around the pixel of interest.

14. The distance measurement apparatus according to claim 11, wherein the measurement pattern has a cyclic nature, and
wherein the size of the smoothing filter to be applied by the smoothing filter application unit is determined based on a cycle of the measurement pattern in the first captured image.

15. The distance measurement apparatus according to claim 11, wherein the measurement pattern is a spatial coding pattern in which a light portion and a dark portion are repeated in a predetermined cycle, and
wherein the size of the smoothing filter to be applied by the smoothing filter application unit is determined to be smaller than a single cycle of the light portion and the dark portion of the measurement pattern in the second captured image.

16. The distance measurement apparatus according to claim 11, wherein the measurement pattern and the approximately uniform illumination light are projected or emitted by a same apparatus.

17. The distance measurement apparatus according to claim 11, wherein the first captured image and the second captured image are captured by a same imaging apparatus.

18. A distance measurement method comprising:
acquiring a first captured image obtained by capturing a measurement target object onto which a measurement pattern is projected, and a second captured image obtained by capturing the measurement target object irradiated with approximately uniform illumination;
determining, based on the second captured image, a smoothing filter to be applied to the first captured image;
applying the smoothing filter determined in the determining to the first captured image; and
measuring a distance from the measurement target object based on the first captured image to which the smoothing filter is applied in the applying.

19. A distance measurement method comprising:
acquiring a first captured image obtained by capturing a measurement target object onto which a measurement pattern is projected, and a second captured image obtained by capturing the measurement target object irradiated with approximately uniform illumination;
applying a smoothing filter to the first captured image; and
measuring a distance from the measurement target object based on the first captured image to which the smoothing filter is applied in the applying,
wherein a size of the smoothing filter applied in the applying is determined based on the second captured image.

20. A non-transitory computer-readable storage medium having stored thereon a program for causing a computer to execute a distance measurement method, the distance measurement method comprising:
acquiring a first captured image obtained by capturing a measurement target object onto which a measurement pattern is projected, and a second captured image obtained by capturing the measurement target object irradiated with approximately uniform illumination;
determining, based on the second captured image, a smoothing filter to be applied to the first captured image;
applying the smoothing filter determined in the determining to the first captured image; and
measuring a distance from the measurement target object based on the first captured image to which the smoothing filter is applied in the applying.

21. A non-transitory computer-readable storage medium having stored thereon a program for causing a computer to execute a distance measurement method, the distance measurement method comprising:
acquiring a first captured image obtained by capturing a measurement target object onto which a measurement pattern is projected, and a second captured image obtained by capturing the measurement target object irradiated with approximately uniform illumination;
applying a smoothing filter to the first captured image; and
measuring a distance from the measurement target object based on the first captured image to which the smoothing filter is applied in the applying,
wherein a size of the smoothing filter applied in the applying is determined based on the second captured image.

* * * * *